United States Patent
Wakasa et al.

(10) Patent No.: US 8,502,406 B2
(45) Date of Patent: *Aug. 6, 2013

(54) VARIABLE-SPEED POWER GENERATOR AND METHOD OF CONTROLLING THE SAME

(75) Inventors: Tsuyoshi Wakasa, Tokyo (JP); Akira Yasugi, Tokyo (JP); Takatoshi Matsushita, Tokyo (JP); Takehiro Naka, Tokyo (JP); Takumi Nakashima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,995

(22) Filed: Jul. 16, 2012

(65) Prior Publication Data
US 2013/0001955 A1    Jan. 3, 2013

Related U.S. Application Data

(63) Continuation of application No. PCT/JP2011/050478, filed on Jan. 13, 2011.

(30) Foreign Application Priority Data

Jan. 18, 2010  (JP) ................................ 2010-008177

(51) Int. Cl.
*F03D 9/00* (2006.01)
(52) U.S. Cl.
USPC .................................. 290/44; 290/55; 363/37
(58) Field of Classification Search
USPC ..... 290/44, 55; 415/1; 416/1; 700/286–290
See application file for complete search history.

(56) References Cited

U.S. PATENT DOCUMENTS

| | | | |
|---|---|---|---|
| 5,083,039 A * | 1/1992 | Richardson et al. | 290/44 |
| 8,053,917 B2 * | 11/2011 | Wakasa et al. | 290/44 |
| 2004/0026929 A1 * | 2/2004 | Rebsdorf et al. | 290/44 |
| 2005/0002210 A1 | 1/2005 | Moon et al. | |

(Continued)

FOREIGN PATENT DOCUMENTS

| | | | |
|---|---|---|---|
| JP | S55-56499 A | 4/1980 | |
| JP | H04-275087 A | 9/1992 | |

OTHER PUBLICATIONS

Japan Patent Office, "Decision to Grant a Patent for JP 2010-008177", Jun. 18, 2013.

*Primary Examiner* — Tulsidas C Patel
*Assistant Examiner* — Viet Nguyen
(74) *Attorney, Agent, or Firm* — Manabu Kanesaka; Kenneth M. Berner; Benjamin J. Hauptman

(57) ABSTRACT

A variable-speed power generator includes a prime mover that generates motive power by using natural energy; a wound-rotor induction generator that includes a stator having a primary winding and a rotor having a secondary winding, which are connected to a power grid, the generator generating electric power based on the motive power generated by the prime mover; a power converter connected to the stator and the rotor; and a controller controlling wound-rotor induction generator. The controller responds to instructions, sent by the power grid, for supplying reactive power to the power grid. The response of the controller to an instruction for supplying reactive power to the power grid may include imposing limitations on the reactive power supplied by the power converter to the power grid and causing the wound-rotor induction generator to operate at a rotation speed set higher than or equal to a synchronous speed.

15 Claims, 9 Drawing Sheets

U.S. PATENT DOCUMENTS

2005/0040655 A1 2/2005 Wilkins et al.
2008/0001411 A1 1/2008 Ichinose et al.
2009/0121483 A1* 5/2009 Xiong et al. .................... 290/44
2009/0302607 A1 12/2009 Kenzaki et al.

* cited by examiner

US 8,502,406 B2

VARIABLE-SPEED POWER GENERATOR AND METHOD OF CONTROLLING THE SAME

CROSS REFERENCE TO RELATED APPLICATIONS

This is a continuation application of International Application PCT/JP2011/50478, with an international filing date of Jan. 13, 2011, which is hereby incorporated by reference herein in its entirety. This application claims the benefit of Japanese Patent Application No. 2010-008177, the content of which is incorporated herein by reference.

TECHNICAL FIELD

The present invention relates to variable-speed power generators and to methods of controlling the same.

BACKGROUND ART

Recently, an increasing number of wind power generators, etc. are being introduced year by year, having a considerable influence on existing power grids. Thus, mainly in Europe and the United States, technical requirements for cooperating with power grids are being specified, and wind power generators (wind farms) are expected to be capable of controlling active power and reactive power so as to contribute to the stabilization of power grids.

Patent Literature 1 discloses a technology in which the range of adjustment of reactive power is increased by adjusting the reactive power using a combination of an electric generator, a power-grid-side power converter attached to the electric generator, other phase modifying equipment, etc.

CITATION LIST

Patent Literature

{PTL 1} United States Patent Application, Publication No. 2005/0040655

SUMMARY OF INVENTION

Technical Problem

In megawatt-class wind power generators, variable-speed wind turbines that are capable of variable-speed operation are the mainstream. Furthermore, the mainstream of the variable-speed operation is, for example, the double-fed (double-fed induction generator (DFIG), or secondary excitation control) system including a wound-rotor induction generator and a power converter. In the double-fed system, the power converter connected to the rotor of the wound-rotor induction generator controls current and voltage on the rotor, thereby controlling reactive power and active power of the wound-rotor induction generator. In this case, the apparent power that can be supplied (i.e., the vector sum of reactive power and active power) is restricted in accordance with the rotation speed of the wound-rotor induction generator. That is, there is a relationship that the active power decreases when the reactive power supplied from the power converter is increased and the reactive power decreases when the active power supplied is increased.

However, since the variable-speed range of a double-fed variable-speed wind turbine is determined by the active power supplied from the wind power generator to the power grid, for example, when the reactive power supplied from the power converter is increased in response to a request for reactive power from the power grid, the active power supplied from the power converter decreases, resulting in a failure to ensure a sufficient variable-speed range although it is possible to supply reactive power.

Furthermore, in the case where reactive power is supplied by a power-grid-side power converter in response to a request for reactive power from the power grid, as in Patent Document 1, since the range of adjustment of reactive power is small, it is not possible to supply sufficient reactive power.

The present invention has been made in view of the situation described above, and it is an object thereof to provide a variable-speed power generator and a method of controlling the same that make it possible to supply reactive power in accordance with a reactive-power supply instruction from a power grid while ensuring a variable-speed range of a wound-rotor induction generator.

Solution to Problem

The present invention employs the following solutions in order to overcome the problems described above.

A first aspect of the present invention is a variable-speed power generator including a prime mover that generates motive power by using natural energy; a wound-rotor induction generator that includes a stator having a primary winding and a rotor having a secondary winding, the stator and the rotor being connected to a power grid, and that generates electric power based on the motive power generated by the prime mover; and a power converter connected to the stator and the rotor, wherein the power converter does not supply reactive power to the power grid, and wherein the variable-speed power generator includes a controller that causes the wound-rotor induction generator to operate at a rotation speed set to be higher than or equal to a synchronous speed and increases reactive power supplied to the power grid when a reactive-power supply instruction for supplying reactive power to the power grid is obtained from the power grid.

With this configuration, when a reactive-power supply instruction is obtained from the power grid, reactive power is not supplied from the power converter, and the wound-rotor induction generator is caused to operate at a rotation speed set to be higher than the rated rotation speed, whereby reactive power is supplied from the wound-rotor induction generator.

In the variable-speed power generator, the variable range of the rotation speed of the wound-rotor induction generator increases as active power that can be adjusted between the power converter and the rotor of the wound-rotor induction generator increases. On the other hand, when the reactive power supplied from the power converter to the power grid is increased, the active power that can be supplied decreases. According to the present invention, reactive power is not supplied from the power converter to the power grid when a reactive-power supply instruction is received from the power grid, so that the active power supplied from the power converter does not decrease. Therefore, the variable-speed range of the wound-rotor induction generator is not reduced compared with the case where reactive power is supplied from the power converter.

Furthermore, when the rotation speed of the wound-rotor induction generator is higher than the synchronous speed, the vector sum of the active power and reactive power that can be supplied to the power grid becomes greater than that in the case of the synchronous speed. On the other hand, when the rotation speed is lower than the synchronous speed, the vector sum of the active power and reactive power becomes less than that in the case of the synchronous speed. Thus, by causing the wound-rotor induction generator to operate at a rotation speed higher than the rated rotation speed set to be higher than or equal to the synchronous speed, it is possible to increase the reactive power that can be supplied to the power grid compared with the cases of the synchronous speed and the rated rotation speed. Causing the induction generator to operate at a rotation speed higher than the synchronous rotation speed means controlling the slip of the induction generator so that the slip increases in the negative direction.

The variable-speed power generator according to the first aspect of the present invention may have a normal operation mode, in which the wound-rotor induction generator operates at the rated rotation speed, and a reactive-power-prioritized operation mode, in which the wound-rotor induction generator operates at a rotation speed higher than the rated rotation speed and in which reactive power is supplied from the wound-rotor induction generator to the power grid, and the controller may be configured to switch from the normal operation mode to the reactive-power-prioritized operation mode when a reactive-power supply instruction is obtained from the power grid.

With this configuration, since it is possible to switch between the normal operation mode and the reactive-power-prioritized operation mode, it is readily possible to supply reactive power to the power grid based on a reactive-power supply instruction.

In the variable-speed power generator according to the first aspect of the present invention, the controller may be configured to control the pitch angles of blades of the prime mover that generates motive power by using natural energy received so that the wound-rotor induction generator operates at a rotation speed higher than the rated rotation speed.

With this configuration, the pitch angles of the blades of the prime mover are controlled so that the rotation speed of the wound-rotor induction generator becomes higher than the rated rotation speed. For example, in the case where the prime mover is a wind turbine, by controlling the pitch angles of the blades to the fine side, it is possible to rotate the wind turbine even with weak wind, increasing the rotation speed of the wound-rotor induction generator.

In the variable-speed power generator according to the first aspect of the present invention, the controller may be configured to control active power of the wound-rotor induction generator so that the wound-rotor induction generator operates at a rotation speed higher than the rated rotation speed.

With this configuration, it is possible to reduce the load by reducing the active power supplied to the wound-rotor induction generator without controlling the blade pitch angles, thereby increasing the reactive power supplied from the wound-rotor induction generator.

The variable-speed power generator according to the first aspect of the present invention may further include a cooling unit that keeps the temperature of the wound-rotor induction generator within a predetermined range.

With this configuration, by cooling the wound-rotor induction generator so that the temperature thereof is kept within the predetermined range, heat generation by the windings of the wound-rotor induction generator can be suppressed. This serves to inhibit a decrease in the apparent power that can be supplied to the power grid due to an increase in the temperature of the windings of the wound-rotor induction generator. For example, the cooling unit refers to a cooling fan and a cooling medium (e.g., air), etc.

In the variable-speed power generator according to the first aspect of the present invention, the controller may be configured to control reactive power and/or active power that can be supplied to the power grid in accordance with a time range.

With this configuration, the reactive power supplied to the power grid is increased or decreased in accordance with time ranges. For example, the reactive power supplied is increased when the outdoor air temperature is relatively low, for example, in winter or at night as compared with in summer or at daytime, whereas the reactive power supplied is decreased when the outdoor air temperature is relatively high, for example, in summer or at daytime as compared with in winter or at night. As described above, it is possible to increase or decrease the range of reactive power than can be supplied in accordance with the environment.

The variable-speed power generator according to the first aspect of the present invention may be a wind power generator in which the prime mover generates motive power by using wind power.

The variable-speed power generator according to the first aspect of the present invention may be a hydroelectric power generator in which the prime mover generates motive power by using hydroelectric power.

A second aspect of the present invention is a method of controlling a variable-speed power generator including a prime mover that generates motive power by using natural energy; a wound-rotor induction generator that includes a stator having a primary winding and a rotor having a secondary winding, the stator and the rotor being connected to a power grid, and that generates electric power based on the motive power generated by the prime mover; and a power converter connected to the stator and the rotor, wherein the power converter does not supply reactive power to the power grid, and wherein, when a reactive-power supply instruction for supplying reactive power to the power grid is obtained from the power grid, the wound-rotor induction generator is caused to operate at a rotation speed set to be higher than or equal to a synchronous speed, and reactive power supplied to the power grid is increased.

Advantageous Effects of Invention

According to the present invention, an advantage is afforded in that it is possible to supply reactive power in accordance with a reactive-power supply instruction obtained from a power grid while ensuring a variable-speed range of a wound-rotor induction generator.

DESCRIPTION OF EMBODIMENTS

Now, variable-speed power generators, control methods therefor, and control programs therefor according to embodiments of the present invention will be described with reference to the drawings.

First Embodiment

A first embodiment of the present invention will be described below with reference to FIG. 1.

It is assumed here that a variable-speed power generator according to this embodiment is a wind power generator that operates at a variable speed by a double-fed system. A double-fed system is also called a "super-synchronous Scherbius system" or a "secondary excitation system."

Figure 1:
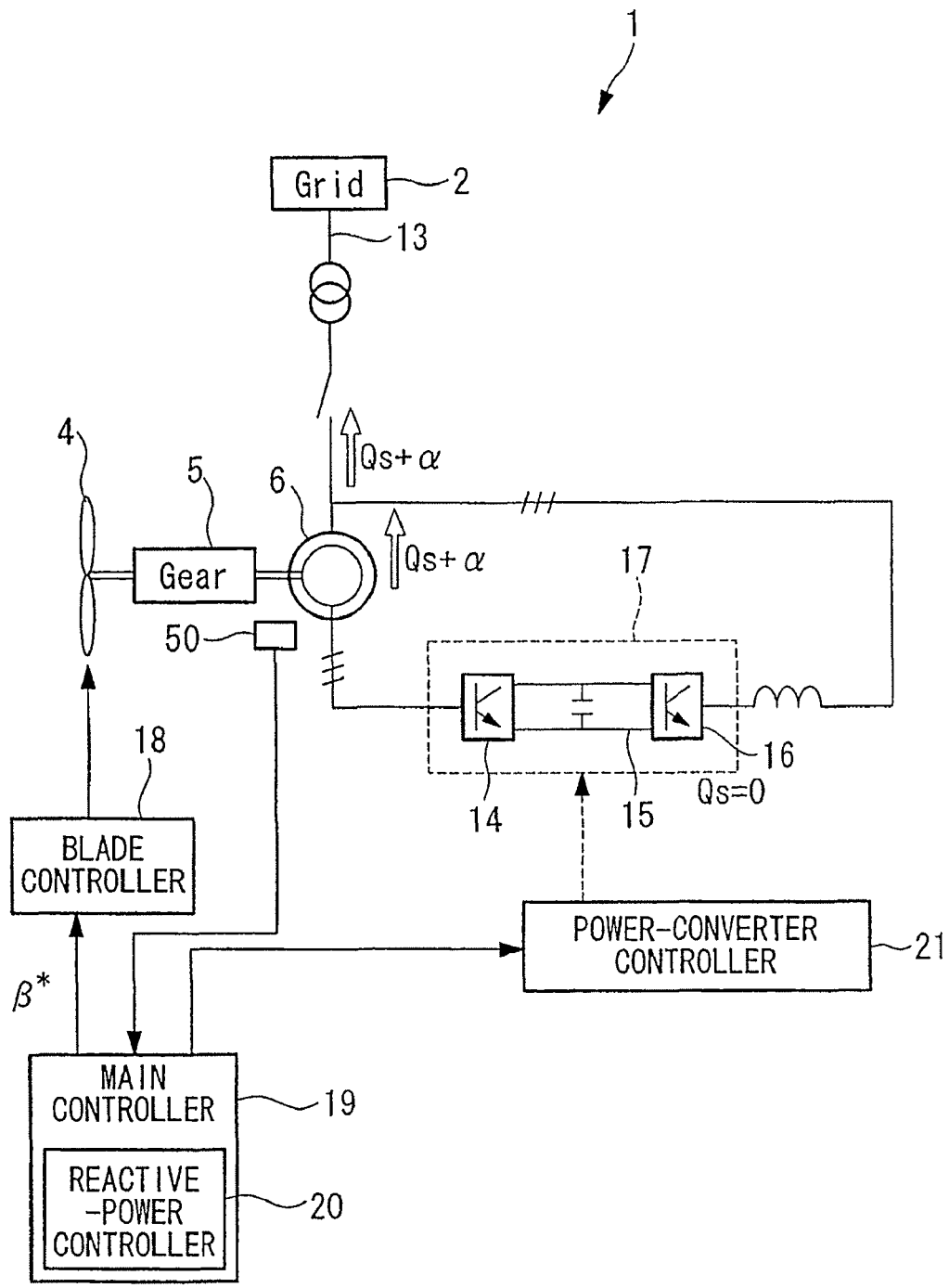
FIG. 1 is a block diagram schematically showing the configuration of a wind power generator according to a first embodiment of the present invention.

FIG. 1 is a block diagram showing an example configuration of an electric generator (wound-rotor induction generator) 6, and its periphery, provided in a wind power generator 1.

As shown in FIG. 1, the wind power generator 1 includes wind-turbine blades 4, a gear 5, an electric generator 6, a power converter 17, a power-converter controller 21, a blade controller 18, and a main controller 19. The electric generator 6 is connected to a power grid 2. Furthermore, the rotor of the electric generator 6 is connected to a wind-turbine rotor (not shown) via the gear 5. In the periphery of the electric generator 6, a rotor-speed detecting unit 50 for detecting the rotor speed of the electric generator 6 is provided. The rotor speed detected by the rotor-speed detecting unit 50 is output to the main controller 19, which will be described later.

In this embodiment, the electric generator 6 is configured such that electric power generated by the electric generator 6 can be output to the power grid 2 both from the stator winding (stator) and the rotor winding (rotor). Specifically, the stator winding of the electric generator 6 is connected to the power grid 2, and the rotor winding of the electric generator 6 is connected to the power grid 2 via the power converter 17.

The power converter 17 includes a converter 14, a DC bus 15, and an inverter 16. The power converter 17 converts AC power received from the rotor winding into AC power adapted to the frequency of the power grid 2. The converter 14 converts AC power generated on the rotor winding into DC power and outputs the DC power to the DC bus 15. The inverter 16 converts the DC power received from the DC bus 15 into AC power having the same frequency as the power grid 2 and outputs the AC power.

The power converter 17 also has the function of converting AC power received from the power grid 2 into AC power adapted to the frequency of the rotor winding. In this case, the inverter 16 converts the AC power into DC power and outputs the DC power to the DC bus 15. The converter 14 converts the DC power received from the DC bus 15 into AC power adapted to the frequency of the rotor winding and supplies the AC power to the rotor winding of the electric generator 6.

The main controller 19 includes a reactive-power controller 20. The reactive-power controller 20 determines a pitch-angle instruction value $\beta^*$ for the wind-turbine blades 4 and outputs the pitch-angle instruction value $\beta^*$ to the blade controller 18. Furthermore, the reactive-power controller 20 outputs a reactive-power instruction value to the power-converter controller 21 such that the reactive power output from the power converter 17 becomes zero.

Figure 2:
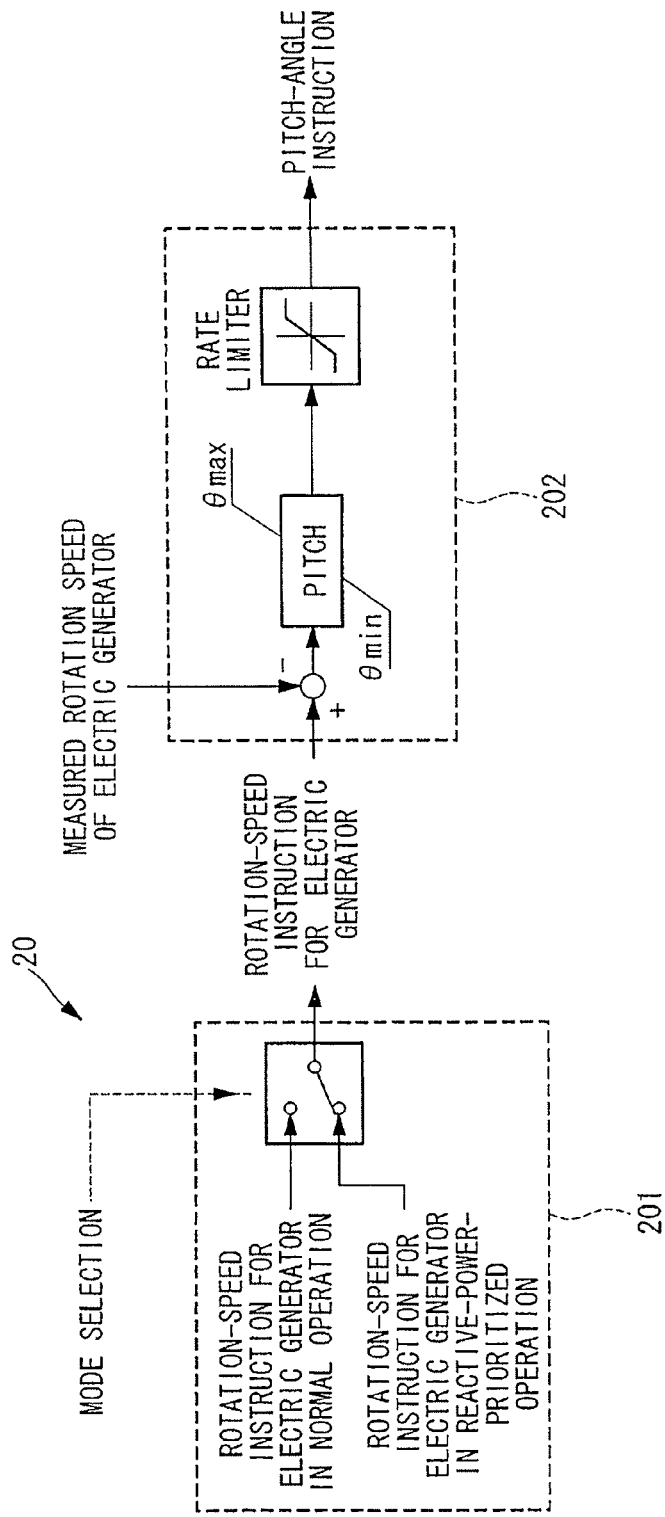
FIG. 2 is a functional block diagram of a reactive-power controller according to the first embodiment of the present invention.

Specifically, as shown in FIG. 2, the reactive-power controller 20 includes a rotation-speed-instruction outputting unit 201 and an instruction-value determining unit 202.

The rotation-speed-instruction outputting unit 201 outputs a rotation-speed instruction for the electric generator 6 in accordance with an operation mode to the instruction-value determining unit 202 based on a reactive-power supply instruction obtained from the power grid 2. Specifically, the wind power generator 1 has a normal operation mode, in which the electric generator 6 operates at a rated rotation speed (e.g., 10% to 20% higher than the synchronous rotation speed) set to be higher than or equal to the synchronous speed, and a reactive-power-prioritized operation mode, in which the electric generator 6 operates at a rotation speed (hereinafter referred to as a "reactive-power-prioritized rotation speed") higher than the rated rotation speed and in which reactive power is supplied from the electric generator 6 to the power grid 2.

When the wind power generator 1 is to be operated in the normal operation mode, the rotation-speed-instruction outputting unit 201 outputs the rotation speed for normal operation of the electric generator 6 (i.e., the rated rotation speed) as a rotation-speed instruction. On the other hand, when a reactive-power supply instruction is obtained from the power grid 2, so that the wind power generator 1 is to be operated in the reactive-power-prioritized operation mode, the rotation-speed-instruction outputting unit 201 outputs the reactive-power-prioritized rotation speed as a rotation-speed instruction. The reactive-power-prioritized rotation speed is a rotation speed within a permitted rotation speed set for the electric generator 6.

Now, the basis for setting the electric generator 6 to a rotation speed higher than the rated rotation speed in the case of the reactive-power-prioritized operation mode will be described.

Figure 3:
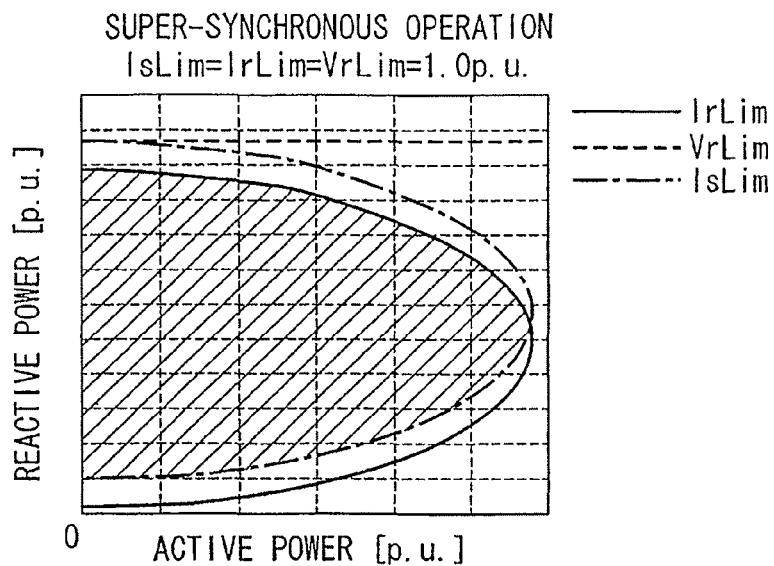
FIG. 3 is a diagram showing output levels of active power and reactive power in the case of a super-synchronous speed.
Figure 4:
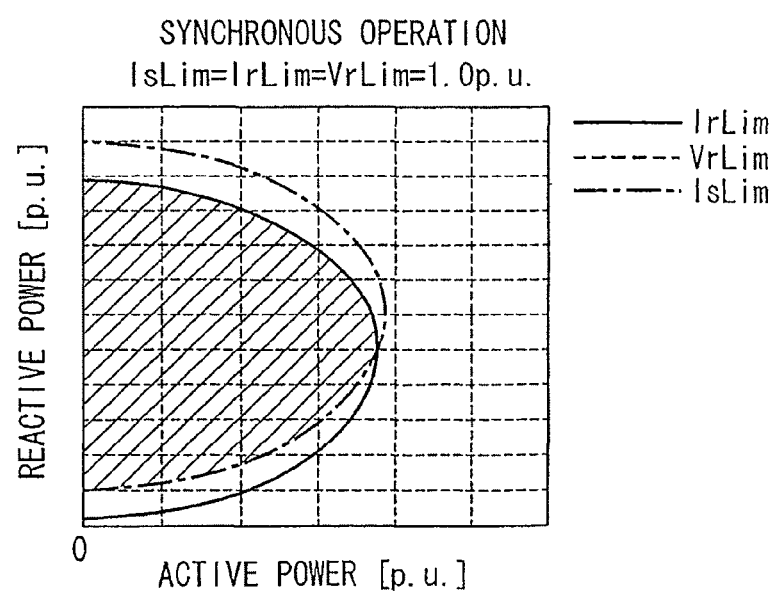
FIG. 4 is a diagram showing output levels of active power and reactive power in the case of a synchronous speed.
Figure 5:
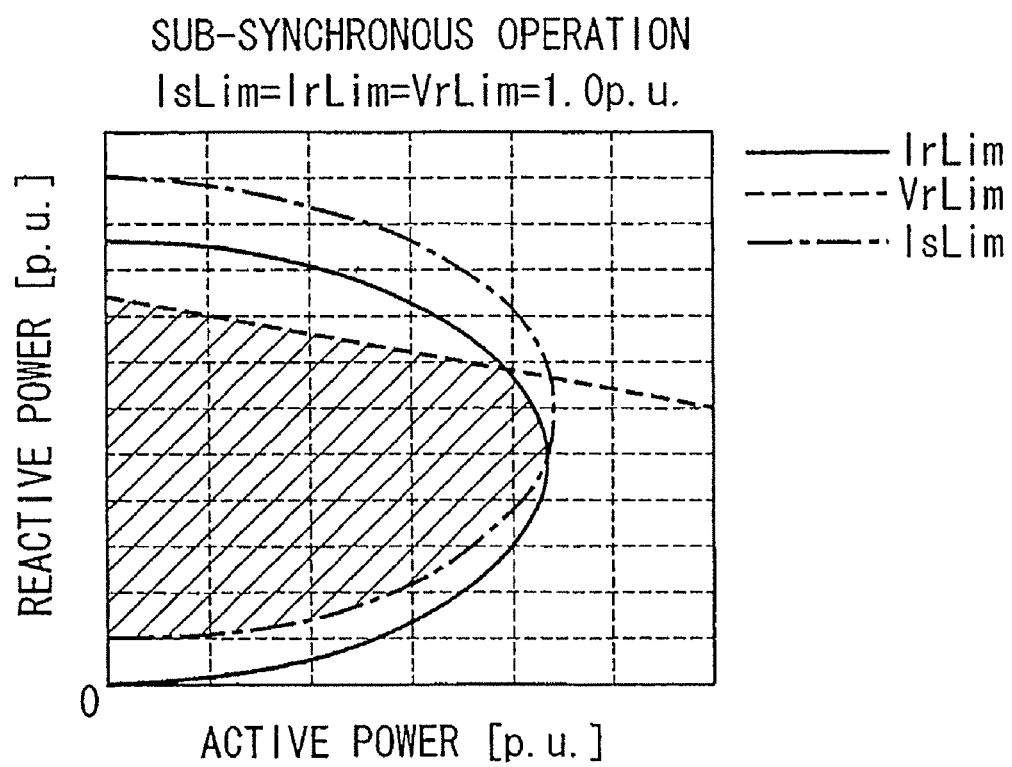
FIG. 5 is a diagram showing output levels of active power and reactive power in the case of a sub-synchronous speed.

FIGS. 3 to 5 show the active power that can be output along the horizontal axes and the reactive power that can be output along the vertical axes, for different rotation speeds of the electric generator 6. FIGS. 3 to 5 show examples of limit curve representing the relationship between reactive energy and active energy, in which FIG. 3 shows the case of a super-synchronous speed, FIG. 4 shows the case of a synchronous speed, and FIG. 5 shows the case of a sub-synchronous speed. In FIGS. 3 to 5, solid lines represent limit values of a current that flows through the rotor winding (rotor current limit), dashed dotted lines represent limit values of a current that flows through the stator winding (stator current limit), and dotted lines represent limit values of a voltage that is generated on the rotor (rotor voltage limits), where the current limits are determined by thermal restrictions and the voltage limits are determined by the dielectric strength. The hatched portions surrounded by these curves represent ranges where reactive power and active power can be output.

Since the electric generator 6 is a variable-speed induction generator, its rotation speed changes. This is generally expressed by a relative speed called a slip. The slip can be expressed by the following equation, where s denotes the slip, Ns denotes the synchronous speed, and N denotes the rotation speed of the electric generator 6.

$$s=(Ns-N)/Ns$$

When the slip is positive, the rotation speed is lower than the synchronous speed (i.e., sub-synchronous operation). On the other hand, when the slip is negative, the rotation speed is higher than the synchronous speed (i.e., super-synchronous operation).

As will be understood from FIGS. 3 to 5, as the slip increases in super-synchronous operation, the hatched region becomes larger, i.e., the output level of reactive power and active power increases. Thus, in this embodiment, the rotation speed is determined in consideration of the fact that, by setting a rotation speed higher than the synchronous speed, it is possible to supply a greater amount of reactive power than in the case of the synchronous speed. Since the rated rotation speed for the normal operation mode is 10% to 20% higher than the synchronous speed in this embodiment, the rotation speed for the reactive-power-prioritized operation mode is set to be even higher than the rated rotation speed (rotation speed for the normal operation mode) higher than or equal to the synchronous speed.

The instruction-value determining unit 202 determines a pitch-angle value $\beta^*$ for the wind-turbine blades 4 based on the rotation speed of the electric generator 6 detected by the rotor-speed detecting unit 50 and the rotation-speed instruction output from the rotation-speed-instruction outputting unit 201 and outputs the pitch-angle instruction value $\beta^*$ to the blade controller 18. Specifically, the instruction-value determining unit 202 determines a target value of the pitch angle of the wind-turbine blades 4 based on the difference between the rotation-speed instruction and the rotation speed detected by the rotor-speed detecting unit 50 and determines a pitch-angle instruction value $\beta^*$ by using a rate limiter that restricts a sudden change in the pitch angle. The pitch-angle instruction value $\beta^*$ is an instruction value for controlling the pitch angle of the wind-turbine blades 4 to the feather side.

As described above, the rotation speed of the electric generator 6 is set to be higher than the rotation speed for the normal operation mode by switching from the normal operation mode to the reactive-power-prioritized operation mode and controlling the pitch angle of the wind-turbine blades 4 to the feather side.

The power-converter controller 21 generates a pulse width modulation (PWM) signal based on a reactive-power instruction value "reactive power Qs=0 [Var]" obtained from the reactive-power controller 20 and supplies the PWM signal to the converter 14 and the inverter 16. Accordingly, the reactive power supplied from the power converter 17 becomes zero.

The blade controller 18 controls the pitch angle of the wind-turbine blades 4 so that the actual pitch angle β coincides with the pitch-angle instruction value $\beta^*$ obtained from the reactive-power controller 20 of the main controller 19.

Next, the operation of the wind power generator 1 according to this embodiment will be described.

The rotor speed of the wind power generator 1 is detected by the rotor-speed detecting unit 50 at predetermined time intervals, and the detected value is supplied to the reactive-power controller 20 of the main controller 19. When a reactive-power supply instruction from the power grid 2 is input to the reactive-power controller 20, the operation mode is switched from the normal operation mode to the reactive-power-prioritized operation mode. Upon switching to the reactive-power-prioritized operation mode, the rotation-speed-instruction outputting unit 201 outputs a reactive-power-prioritized rotation speed to the instruction-value determining unit 202 as a rotation-speed instruction. The instruction-value determining unit 202 compares the reactive-power-prioritized rotation speed with a measured rotation speed of the electric generator 6 obtained from the rotor-speed detecting unit 50, determines a pitch-angle instruction value $\beta^*$ to control the pitch angle of the wind-turbine blades 4 to the feather side, and outputs the pitch-angle instruction value $\beta^*$ to the blade controller 18.

The blade controller 18 controls the pitch angle of the wind-turbine blades 4 so that the actual pitch angle β coincides with the pitch-angle instruction value $\beta^*$ corresponding to the reactive-power supply instruction from the power grid 2.

Furthermore, the main controller 19 notifies the power-converter controller 21 of a reactive-power instruction value indicating reactive power Qs=0. The power-converter controller 21 controls the power converter 17 by using a PWM signal based on the reactive-power instruction value "reactive power Qs=0 [Var]."

Then, the wind power generator 1 operates in the reactive-power-prioritized operation mode until an instruction for switching to the normal operation mode is obtained from the power grid 2.

Thus, reactive power is not supplied from the power converter 17, and the electric generator 6 operates at a rotation speed higher than that in the case of the normal operation mode. Accordingly, reactive power Qs+α is supplied from the electric generator 6 to the power grid 2 in accordance with the reactive-power supply instruction, whose amount is greater compared with the case of the normal operation mode.

As described above, with the variable-speed power generator, a control method therefor, and a control program therefor according to this embodiment, when a reactive-power supply instruction is received from the power grid 2, reactive power is not supplied from the power converter 17, and the electric generator 6 operates at the reactive-power-prioritized rotation speed set to be higher than the rated rotation speed, so that the electric generator 6 supplies a greater amount of reactive power than in the case of the normal operation mode. Since reactive power is not supplied from the power converter 17 to the power grid 2 when a reactive-power supply instruction is received from the power grid 2 as described above, active power supplied from the power converter 17 is not reduced. Compared with the case where reactive power is also supplied from the power converter 17, since the active power that can be supplied to the power grid 2 is not reduced, it is possible to supply reactive power in accordance with the reactive-power supply instruction from the power grid 2 while ensuring a variable-speed range of the electric generator 6.

In the embodiment described above, when in the reactive-power-prioritized operation mode, the reactive-power-prioritized rotation speed output from the rotation-speed-instruction outputting unit 201 is a fixed value. However, without limitation to the embodiment, instead of using a fixed value, for example, the reactive-power-prioritized rotation speed may be changed in accordance with a reactive-power request instruction from the power grid 2 or a voltage value of the power grid 2.

Figure 6:
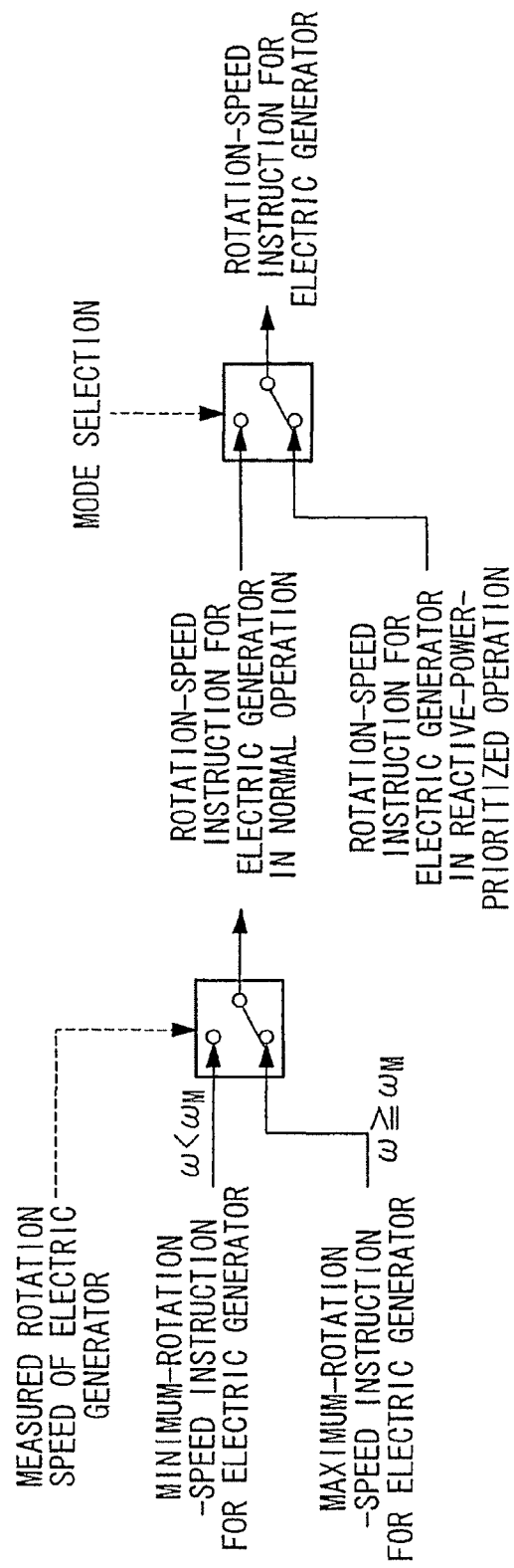
FIG. 6 is a diagram for explaining switching of the rotation speed in the case of a normal operation mode.

Furthermore, in the embodiment described above, when in the normal operation mode, the rotation-speed-instruction outputting unit 201 outputs the rated rotation speed as a rotation-speed instruction for the electric generator 6. However, without limitation to the embodiment, the rotation speed for the normal operation mode may be set in accordance with a measured rotation speed of the wind-turbine blades 4. For example, as shown in FIG. 6, the rotation-speed-instruction outputting unit 201 may be configured to be capable of switching between a minimum electric-generator rotation-speed instruction (e.g., a rotation speed for the case of low wind speed) and a maximum electric-generator rotation-speed instruction (e.g., a rotation speed for the case of high wind speed) based on a measured electric-generator rotation speed (e.g., a rotation speed determined based on the wind speed) detected by the rotor-speed detecting unit 50.

The variable-speed power generator according to this embodiment has been described in the context of an example of a double-fed variable-speed wind power generator. However, without limitation to the example, for example, a double-fed variable-speed hydroelectric power generator may be used instead of a wind power generator.

Second Embodiment

Figure 8:
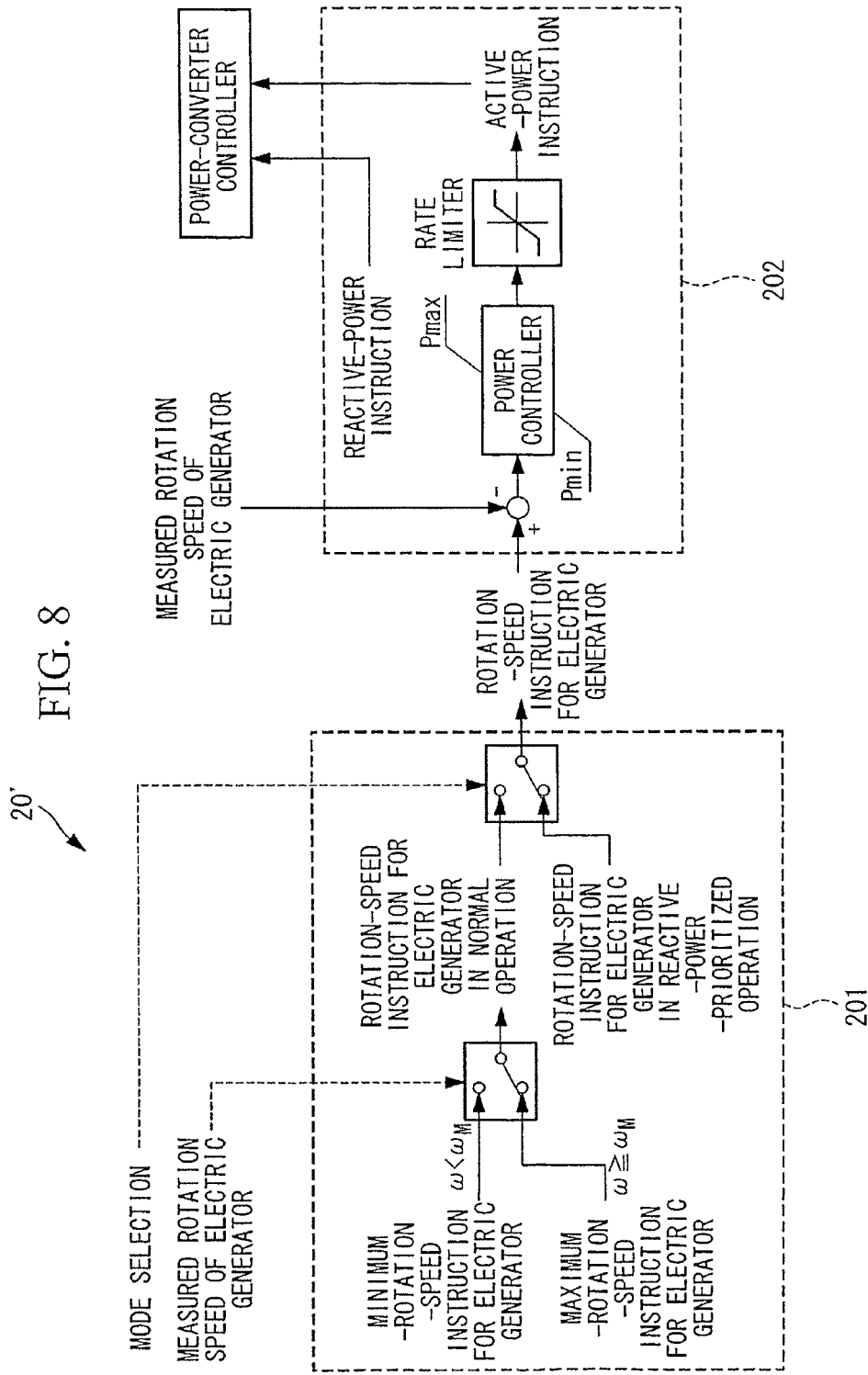
FIG. 8 is a functional block diagram of a reactive-power controller according to the second embodiment of the present invention.

Next, a variable-speed power generator according to a second embodiment of the present invention will be described with reference to FIGS. 8 and 9. This embodiment differs from the first embodiment described above in that, when a reactive-power supply instruction is obtained from the power grid 2 and the rotation speed of the electric generator 6 is increased, active power supplied to the power grid 2 is decreased so that the load of the electric generator 6 will be reduced. The variable-speed power generator according to this embodiment will be described below mainly regarding differences, while omitting a description of commonalities with the first embodiment. The description will be given in the context of an example where the variable-speed power generator according to this embodiment is a wind power generator 1'.

Figure 7:
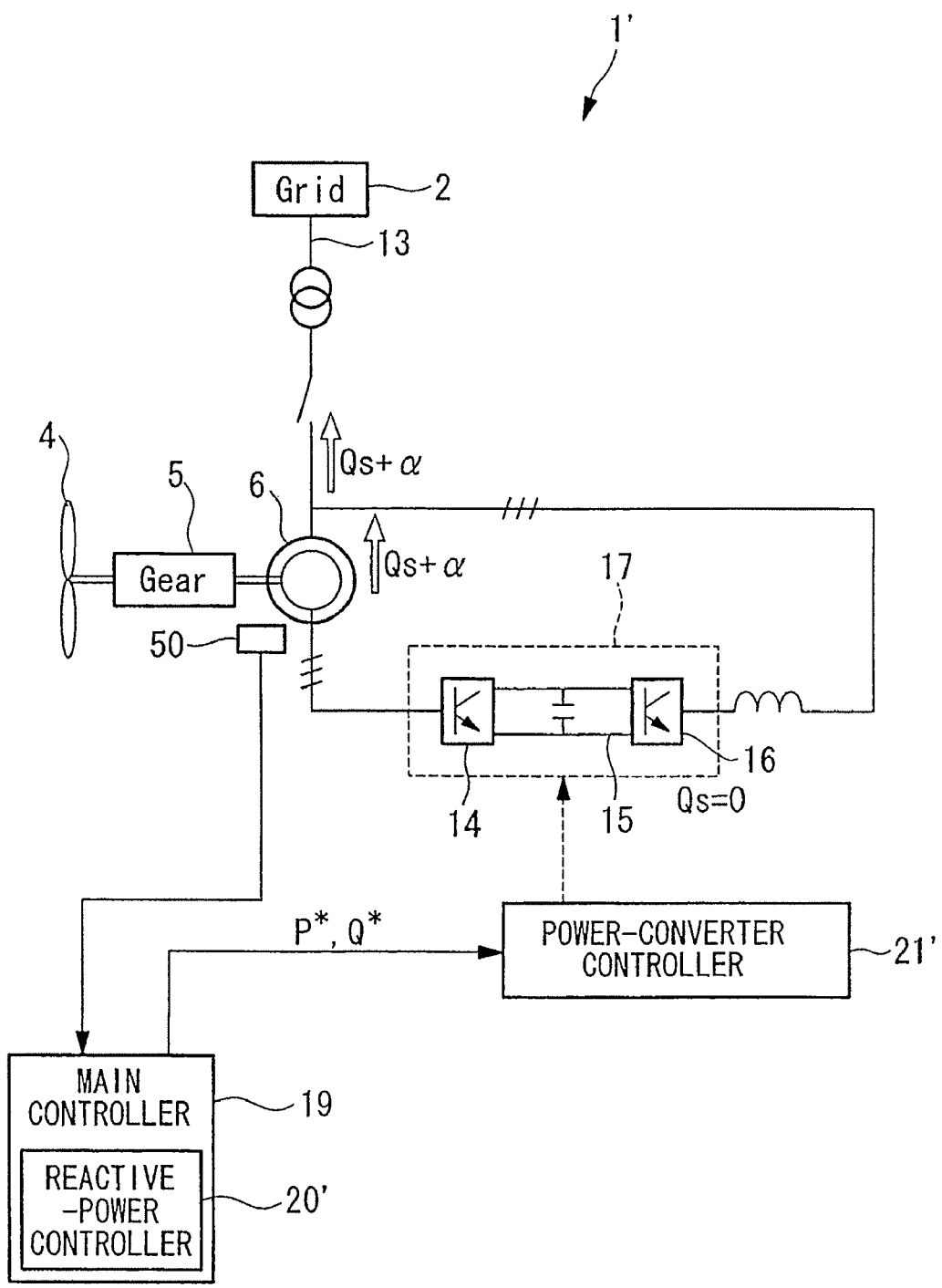
FIG. 7 is a block diagram schematically showing the configuration of a wind power generator according to a second embodiment of the present invention.

FIG. 7 is a block diagram showing an example configuration of the electric generator (wound-rotor induction generator) 6, and its periphery, provided in the wind power generator 1'. FIG. 8 is a functional block diagram of a reactive-power controller 20'.

The instruction-value determining unit 202 determines an active-power instruction value P* for a power-converter controller 21' based on a rotation-speed instruction output from the rotation-speed-instruction outputting unit 201 and a measured rotation speed of the electric generator 6 obtained from the rotor-speed detecting unit 50 and outputs the active-power instruction value P* to the power-converter controller 21'. Specifically, the instruction-value determining unit 202 determines a target value of active power based on the difference between the rotation-speed instruction and the rotation speed detected by the rotor-speed detecting unit 50 and determines the active-power instruction value P* by using a rate limiter that restricts a sudden change in active power. The active-power instruction value P* is a value within a range of variable-speed operation of the electric generator 6 and serves to exercise control so that active power will be reduced in the case of the normal operation mode.

Now, a method of determining the target value of active power will be described.

Figure 9:
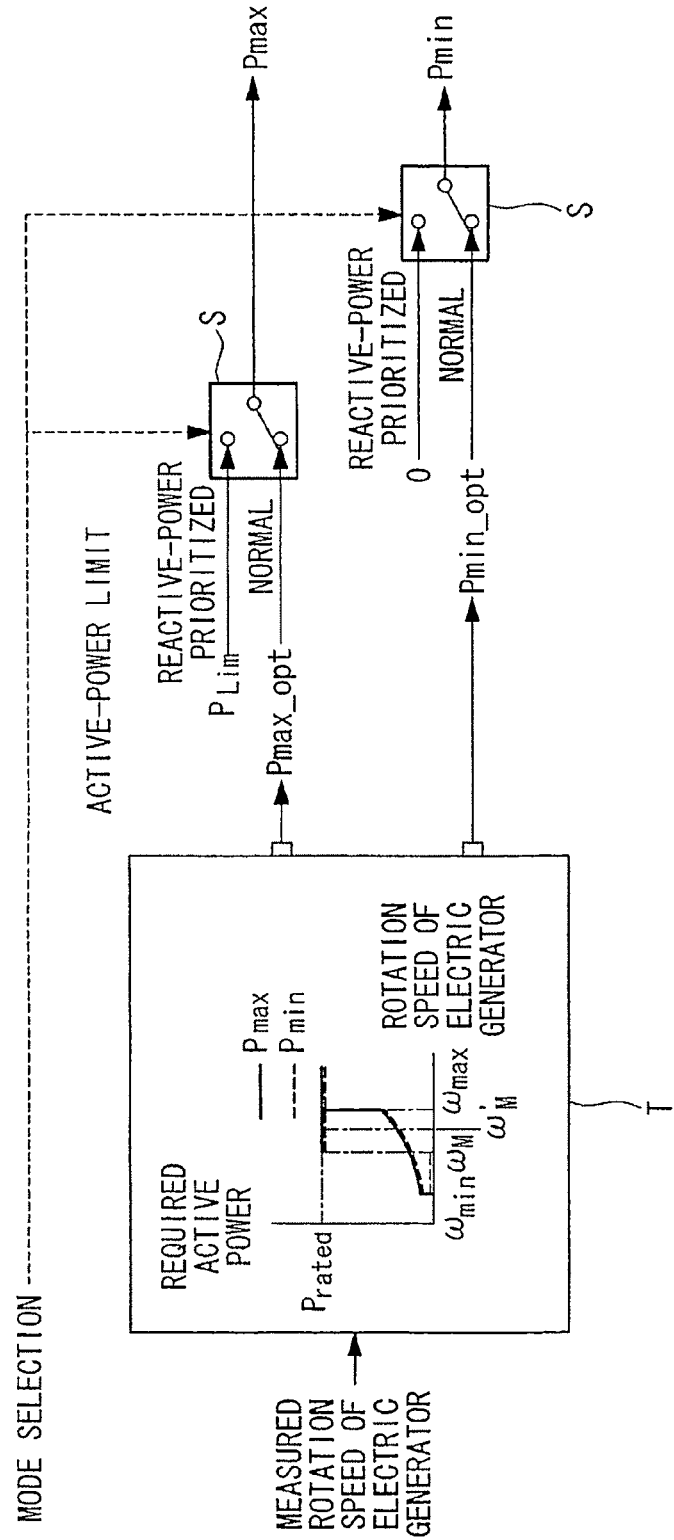
FIG. 9 is a diagram for explaining setting of active power in the case of the normal operation mode.

FIG. 9 is a diagram for explaining the process of determining a maximum active power Pmax and a minimum active power Pmin for a power controller in accordance with a measured rotation speed of the electric generator 6.

The instruction-value determining unit 202 has a table in which rotation speeds are associated with active-power values (e.g., a table T in FIG. 9). Based on the table T, the instruction-value determining unit 202 outputs a maximum value $P_{max\_opt}$ and a minimum value $P_{min\_opt}$ in accordance with the measured rotation speed of the electric generator 6 obtained from the rotor-speed detecting unit 50.

When the normal operation mode is in effect at switches S shown in FIG. 9, the maximum value $P_{max\_opt}$ and the minimum value $P_{min\_opt}$ determined based on the table T are set as the maximum active power Pmax and the minimum active power Pmin, respectively, which are output to the power controller. On the other hand, when the reactive-power-prioritized operation mode is in effect at the switches S shown in FIG. 9, an active-power limit $P_{Lim}$ is set as the maximum active power Pmax and the value of the minimum active power Pmin is set to zero, which are output to the power controller.

The power controller restricts active power using the minimum active power Pmin as a lower limit and the maximum active power Pmax as an upper limit and outputs a target value of active power based on a measured rotation speed and a rotation-speed instruction.

Furthermore, the instruction-value determining unit 202 determines a reactive-power instruction value Q* such that reactive power Qs supplied to the power converter 17 becomes zero.

The power-converter controller 21' controls the power converter 17 based on the reactive-power instruction value Q* so that the reactive power Qs output from the power converter 17 becomes zero and also controls the power converter 17 based on the active-power instruction value P* so that active power output from the electric generator 6 becomes equal to the active-power instruction value P*.

Next, the operation of the wind power generator 1' according to this embodiment will be described.

The rotor speed of the wind power generator 1' is detected by the rotor-speed detecting unit 50 at predetermined time intervals, and the detected value is supplied to the reactive-power controller 20' of the main controller 19. When a reactive-power supply instruction from the power grid 2 is input to the reactive-power controller 20', the operation mode is switched from the normal operation mode to the reactive-power-prioritized operation mode. Upon switching to the reactive-power-prioritized operation mode, the rotation-speed-instruction outputting unit 201 outputs a reactive-power-prioritized rotation speed to the instruction-value determining unit 202 as a rotation-speed instruction. The instruction-value determining unit 202 compares the reactive-power-prioritized rotation speed with a measured rotation speed of the electric generator 6 obtained from the rotor-speed detecting unit 50, determines an active-power instruction value P* based on the difference between these rotation speeds, and outputs the active-power instruction value P* to the power-converter controller 21.

Furthermore, the instruction-value determining unit 202 notifies the power-converter controller 21' of a reactive-power instruction value indicating reactive power Qs=0.

The power-converter controller 21 controls the power converter 17 by using a PWM signal based on the active-power instruction value P* and the reactive-power instruction value "reactive power Qs=0 [Var]."

Then, the wind power generator 1' operates in the reactive-power-prioritized operation mode until an instruction for switching to the normal operation mode is obtained from the power grid 2.

By not supplying reactive power from the power converter 17 and by decreasing the active-power instruction value P* compared with the case of the normal operation mode as described above, the load of the electric generator 6 is reduced compared with the case of the normal operation mode. Thus, the wind-turbine blades 4 rotate with a reduced load compared with the case of the normal operation mode, so that the electric generator 6 enters super-synchronous operation. Furthermore, since the active power supplied to the power grid 2 is reduced compared with the case of the normal operation mode, it is possible to supply a greater amount of reactive power to the power grid 2.

Third Embodiment

Next, a variable-speed power generator according to a third embodiment of the present invention will be described.

The relationships between reactive power and active power, shown in FIGS. 3 to 5, are determined based on thermal restrictions relating to factors such as currents that flow through the windings of the electric generator 6. The third embodiment differs from the first and second embodiments described above in that a cooling unit (not shown) that restricts an increase in the temperature of the windings of the electric generator 6 within a predetermined range is provided in view of this point. The variable-speed power generator according to this embodiment will be described below mainly regarding differences, while omitting a description of commonalities with the first and second embodiments.

For example, by activating a cooling device (e.g., a cooling fan, etc.) as a cooling unit during operation of the electric generator 6 to keep the temperature of the windings of the electric generator 6 within a predetermined range, it is possible to expand the limit curves shown in FIGS. 3 to 5 so that the sum of reactive power and active power supplied increases.

Alternatively, a cooling device and a cooling medium may be provided as a cooling unit. In this case, the cooling device (e.g., a cooling fan, etc.) is activated during operation of the electric generator 6, and the flow level of the cooling medium (e.g., air) is increased, thereby improving the efficiency of heat transfer. Accordingly, it is possible to keep the temperature of the windings of the electric generator 6 within a predetermined range, thereby expanding the limit curves shown in FIGS. 3 to 5.

Fourth Embodiment

Next, a variable-speed power generator according to a fourth embodiment of the present invention will be described.

This embodiment differs from the first, second, and third embodiments described above in that the rotation speed of the electric generator 6 is controlled in accordance with a time range. The variable-speed power generator according to this embodiment will be described below mainly regarding differences, while omitting a description of commonalities with the first, second, and third embodiments.

Figure 10:
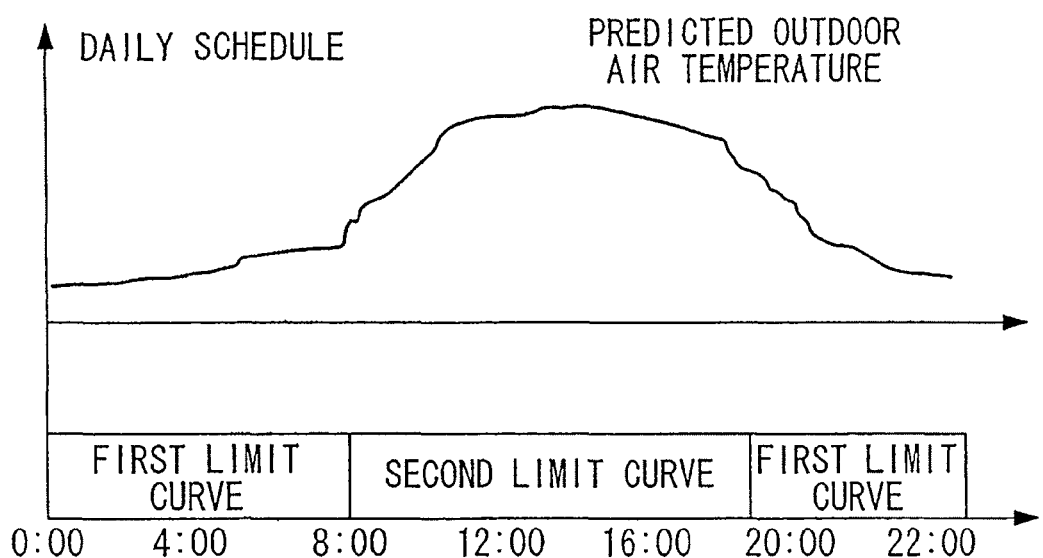
FIG. 10 is a diagram showing an example of limit curves defined in accordance with time ranges in a wind power generator according to a fourth embodiment of the present invention.
Figure 11:
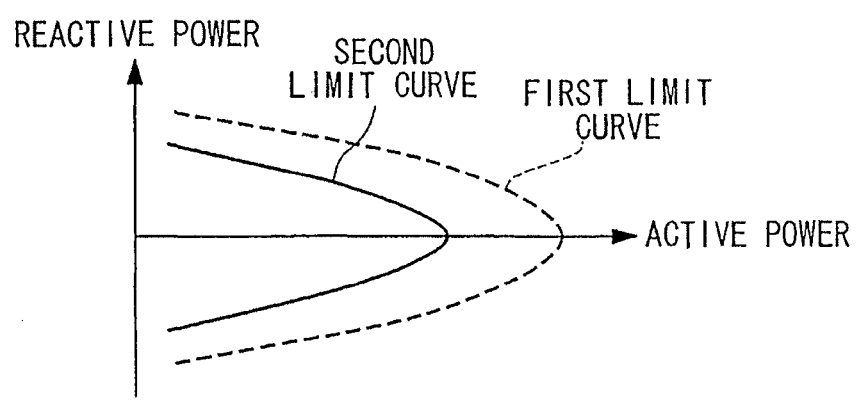
FIG. 11 is a diagram showing an example of limit curves.

Specifically, when the outdoor air temperature is low, for example, in winter or at night, and heat is exchanged with the outdoor air, the rotation speed of the electric generator 6 may be controlled based on time ranges in which cooling effects higher than usual can be expected. For example, as shown in FIG. 10, in the case between 0:00 to 24:00 where a first limit curve shown in FIG. 11 is defined for a time range in which the outdoor air temperature is relatively low (e.g., 0:00 to 8:00 and 20:00 to 24:00) and a second limit curve shown in FIG. 11 is defined for a time range in which the outdoor air temperature is relatively high (e.g., 8:00 to 20:00), the rotation speed of the electric generator 6 is controlled to be higher in the time range in which the outdoor air temperature is relatively low compared with the time range in which the outdoor air temperature is relatively high. The time ranges may be defined based on time of day or seasons in a year.

By controlling the rotation speed of the electric generator 6 in accordance with time ranges as described above, it is possible to save costs of a cooling device, etc. compared with the case where a cooling device, etc. is provided.

REFERENCE SIGNS LIST

1 Wind power generator (variable-speed generator)
6 Electric generator
17 Power converter
20 Reactive-power controller
21 Power-converter controller
201 Rotation-speed-instruction outputting unit
202 Instruction-value determining unit

What is claimed is:

1. A variable-speed power generator comprising:
  (a) a prime mover that generates motive power by using natural energy,
  (b) a wound-rotor induction generator that (b1) includes a stator having a primary winding and a rotor having a secondary winding, the stator and the rotor being connected to a power grid, and that (b2) generates electric power based on the motive power generated by the prime mover,
  (c) a power converter connected to the stator and the rotor, and
  (d) a controller which controls wound-rotor induction generator,
  (d1) wherein the controller responds to instructions for supplying reactive power to the power grid, said instruction being sent by the power grid, and
  (d2) wherein the response of the controller to an instruction for supplying reactive power to the power grid may include (d2a) imposing limitations on the reactive power supplied by the power converter to the power grid and (d2b) causing the wound-rotor induction generator to operate at a rotation speed set to be higher than or equal to a synchronous speed.

2. A variable-speed power generator according to claim 1, wherein the variable-speed power generator has a normal operation mode, in which the wound-rotor induction generator operates at the rated rotation speed, and a reactive-power-prioritized operation mode, in which the wound-rotor induction generator operates at a rotation speed higher than the rated rotation speed and in which reactive power is supplied from the wound-rotor induction generator to the power grid, and wherein the controller switches from the normal operation mode to the reactive-power-prioritized operation mode when a reactive-power supply instruction is obtained from the power grid.

3. A variable-speed power generator according to claim 1, wherein the controller controls the pitch angle of blades of the prime mover that generates motive power by using natural energy received so that the wound-rotor induction generator operates at a rotation speed higher than the rated rotation speed.

4. A variable-speed power generator according to claim 1, wherein the controller controls active power of the wound-rotor induction generator so that the wound-rotor induction generator operates at a rotation speed higher than the rated rotation speed.

5. A variable-speed power generator according to claim 1, further comprising a cooling unit that keeps the temperature of the wound-rotor induction generator within a predetermined range.

6. A variable-speed power generator according to claim 1, wherein the controller controls reactive power and/or active power that can be supplied to the power grid in accordance with a time range.

7. A variable-speed power generator according to claim 1, wherein the prime mover is a wind power generator that generates motive power by using wind power.

8. A variable-speed power generator according to claim 1, wherein the prime mover is a hydroelectric power generator that generates motive power by using hydroelectric power.

9. A method of controlling a variable-speed power generator including a prime mover that generates motive power by using natural energy; a wound-rotor induction generator that includes a stator having a primary winding and a rotor having a secondary winding, the stator and the rotor being connected to a power grid, and that generates electric power based on the motive power generated by the prime mover; and a power converter connected to the stator and the rotor, comprising the steps of:
(a) in response to receipt from the power grid of a reactive-power supply instruction which directs the supplying of reactive power to the power grid, causing the wound-rotor induction generator to operate at a rotation speed set to be higher than or equal to a synchronous speed, and
(b) limiting the reactive power supplied to the grid by the power converter.

10. A method according to claim 9, wherein the step (a) comprises controlling the pitch angle of blades of the prime mover that generates motive power by using natural energy received so that the wound-rotor induction generator operates at a rotation speed higher than the rated rotation speed.

11. A method according to claim 9, wherein the step (b) comprises controlling the active power of the wound-rotor induction generator so that the wound-rotor induction generator operates at a rotation speed higher than the rated rotation speed.

12. A method according to claim 9, further comprising using a cooling unit to keep the temperature of the wound-rotor induction generator within a predetermined range.

13. A method according to claim 9, further comprising controlling reactive power and/or active power that can be supplied to the power grid in accordance with a time range.

14. A method according to claim 9, wherein the prime mover is a wind power generator that generates motive power by using wind power.

15. A method according to claim 9, wherein the prime mover is a hydroelectric power generator that generates motive power by using hydroelectric power.

* * * * *